(12) United States Patent
Lan et al.

(10) Patent No.: US 12,586,732 B2
(45) Date of Patent: Mar. 24, 2026

(54) CAPACITOR ASSEMBLY PACKAGE STRUCTURE HAVING OUTERMOST REINFORCEMENT STRUCTURES

(71) Applicant: APAQ TECHNOLOGY CO., LTD., Miaoli County (TW)

(72) Inventors: Shang-Che Lan, Kaohsiung City (TW); Che-Wei Chang, Miaoli County (TW); Shuo-Yen Ma, Changhua County (TW); Yuh-Shyuan Lai, Tainan City (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 93 days.

(21) Appl. No.: 18/659,095

(22) Filed: May 9, 2024

(65) Prior Publication Data

US 2025/0095925 A1 Mar. 20, 2025

(30) Foreign Application Priority Data

Sep. 20, 2023 (TW) .................................. 112135824

(51) Int. Cl.
*H01G 9/012* (2006.01)
*H01G 9/08* (2006.01)
*H01G 9/15* (2006.01)

(52) U.S. Cl.
CPC ............... *H01G 9/012* (2013.01); *H01G 9/08* (2013.01); *H01G 9/15* (2013.01)

(58) Field of Classification Search
None
See application file for complete search history.

(56) References Cited

U.S. PATENT DOCUMENTS 6,970,344 B2 * 11/2005 Arai ........................ H01G 9/042
29/25.03
6,977,807 B2 * 12/2005 Arai ......................... H01G 9/26
29/25.03
(Continued)

FOREIGN PATENT DOCUMENTS

CN 110895994 A 3/2020
JP H05175085 A * 7/1993 ............. H01G 9/012
(Continued)

*Primary Examiner* — Eric W Thomas
(74) *Attorney, Agent, or Firm* — Li & Cai Intellectual Property (USA) Office

(57) ABSTRACT

A capacitor assembly package structure includes a first bottom electrode structure, a second bottom electrode structure, a capacitor assembly and an insulating package body. The second bottom electrode structure is separate from the first bottom electrode structure. The capacitor assembly is disposed on the first bottom electrode structure and the second bottom electrode structure. The capacitor assembly includes a plurality of capacitor elements electrically connected to each other, and each capacitor element has a positive electrode portion electrically connected to the first bottom electrode structure and a negative electrode portion electrically connected to the second bottom electrode structure. The insulating package body is configured to cover the capacitor elements of the capacitor assembly. Each capacitor element has a raised protruding structure disposed on the positive electrode portion to reduce a shortest vertical distance between the positive electrode portion and the negative electrode portion of each capacitor element.

9 Claims, 10 Drawing Sheets

(56)                References Cited

U.S. PATENT DOCUMENTS

2006/0130300 A1 *   6/2006  Kobayashi ........... H01G 9/0029
                                                            29/25.03
2009/0073638 A1 *   3/2009  Fujii ........................ H01G 9/15
                                                            361/523
2017/0365419 A1 *  12/2017  Demizu ................... H01G 9/15

FOREIGN PATENT DOCUMENTS

TW          202123272  A      6/2021
TW          202141547  A     11/2021
TW          202244965  A     11/2022

* cited by examiner

CAPACITOR ASSEMBLY PACKAGE STRUCTURE HAVING OUTERMOST REINFORCEMENT STRUCTURES

CROSS-REFERENCE TO RELATED PATENT APPLICATION

This application claims the benefit of priority to Taiwan Patent Application No. 112135824, filed on Sep. 20, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a package structure, and more particularly to a capacitor assembly package structure.

BACKGROUND OF THE DISCLOSURE

Applications of capacitors include being widely used in home appliances, computer motherboards and peripherals, power supplies, communication products and automobiles. The capacitors are mainly used to provide functions such as filtering, bypassing, rectifying, coupling, blocking and transforming, and such capacitors have become an indispensable component in electronic products. However, there is still room for improvement in the related art of the capacitor.

SUMMARY OF THE DISCLOSURE

In response to the above-referenced technical inadequacy, the present disclosure provides a capacitor assembly package structure that can be configured to use a raised protruding structure of each capacitor element to reduce a shortest vertical distance between a positive electrode portion and a negative electrode portion of each capacitor element.

In order to solve the above-mentioned problems, one of the technical aspects adopted by the present disclosure is to provide a capacitor assembly package structure, which includes a first bottom electrode structure, a second bottom electrode structure, a capacitor assembly and an insulating package body. The second bottom electrode structure is separate from the first bottom electrode structure. The capacitor assembly is disposed on the first bottom electrode structure and the second bottom electrode structure. The capacitor assembly includes a plurality of capacitor elements electrically connected to each other, and each of the capacitor elements has a positive electrode portion electrically connected to the first bottom electrode structure and a negative electrode portion electrically connected to the second bottom electrode structure. The insulating package body is configured to cover the capacitor elements of the capacitor assembly. Each of the capacitor elements has a raised protruding structure disposed on the positive electrode portion, and the raised protruding structure is disposed on at least one of an upper surface and a lower surface of the positive electrode portion. The two positive electrode portions of two adjacent ones of the capacitor elements are separated from each other through the raised protruding structure, thereby reducing a shortest vertical distance between the positive electrode portion and the negative electrode portion of each capacitor element.

In order to solve the above-mentioned problems, another one of the technical aspects adopted by the present disclosure is to provide a capacitor assembly package structure, which includes a first bottom electrode structure, a second bottom electrode structure, a capacitor assembly and an insulating package body. The second bottom electrode structure is separate from the first bottom electrode structure. The capacitor assembly is disposed on the first bottom electrode structure and the second bottom electrode structure. The capacitor assembly includes a plurality of capacitor elements electrically connected to each other, and each of the capacitor elements has a positive electrode portion electrically connected to the first bottom electrode structure and a negative electrode portion electrically connected to the second bottom electrode structure. The insulating package body is configured to cover the capacitor elements of the capacitor assembly. Each of the capacitor elements has a raised protruding structure disposed on the positive electrode portion, and the raised protruding structure of each capacitor element is configured to reduce a shortest vertical distance between the positive electrode portion and the negative electrode portion of each capacitor element.

Therefore, in the capacitor assembly package structure provided by the present disclosure, by virtue of "each of the capacitor elements having a raised protruding structure disposed on the positive electrode portion," the raised protruding structure of each capacitor element can be configured to reduce a shortest vertical distance between the positive electrode portion and the negative electrode portion of each capacitor element.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
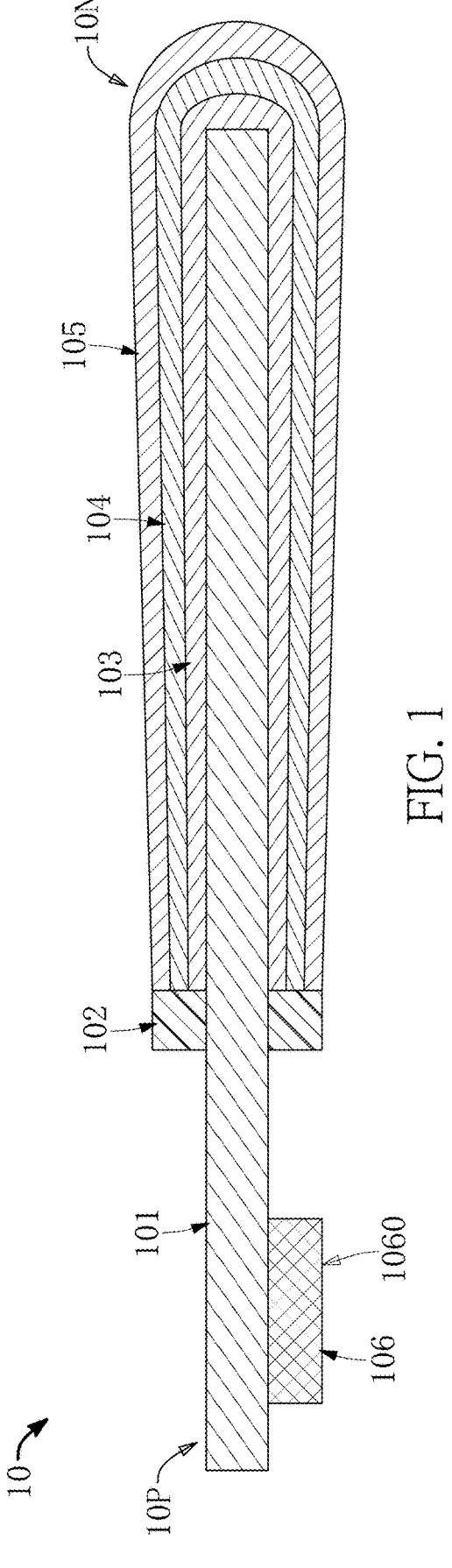
FIG. 1 is a schematic cross-sectional view of a first capacitor element according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
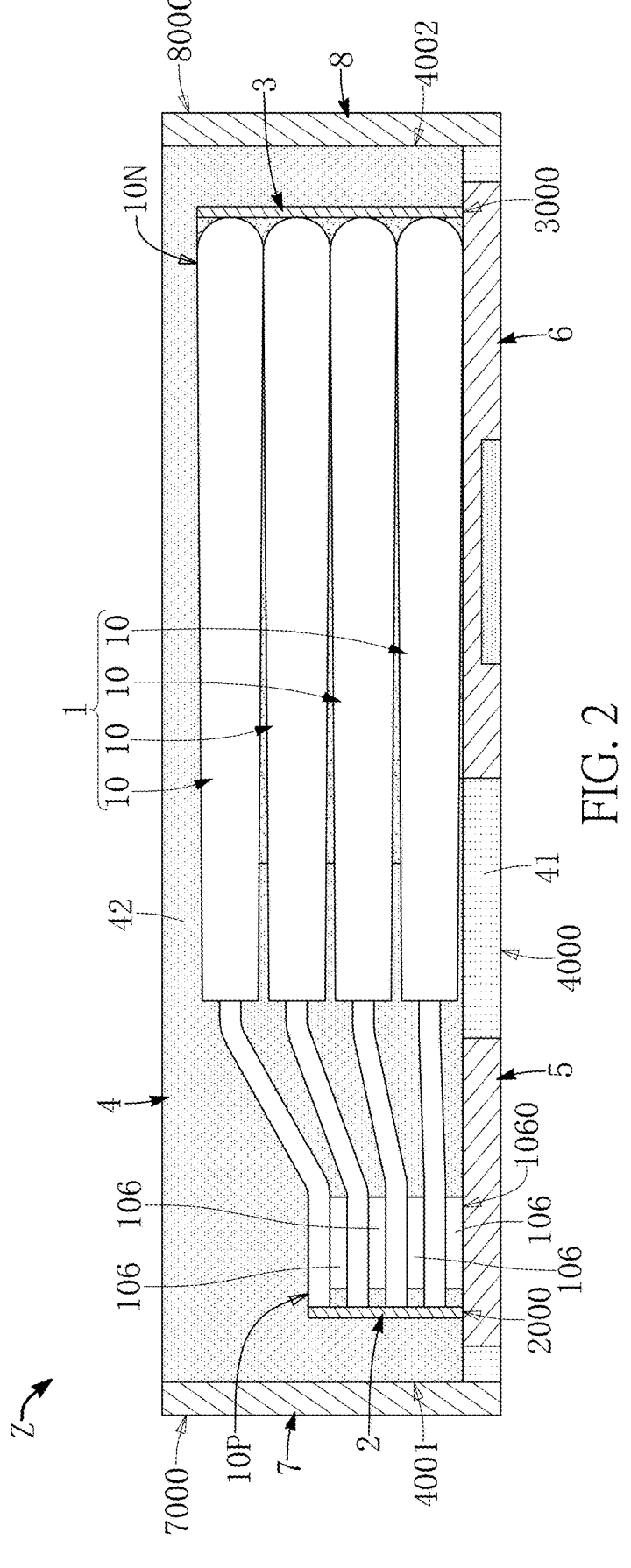
FIG. 2 is a partial schematic cross-sectional view of the capacitor assembly package structure provided by the first embodiment of the present disclosure.
Figure 3:
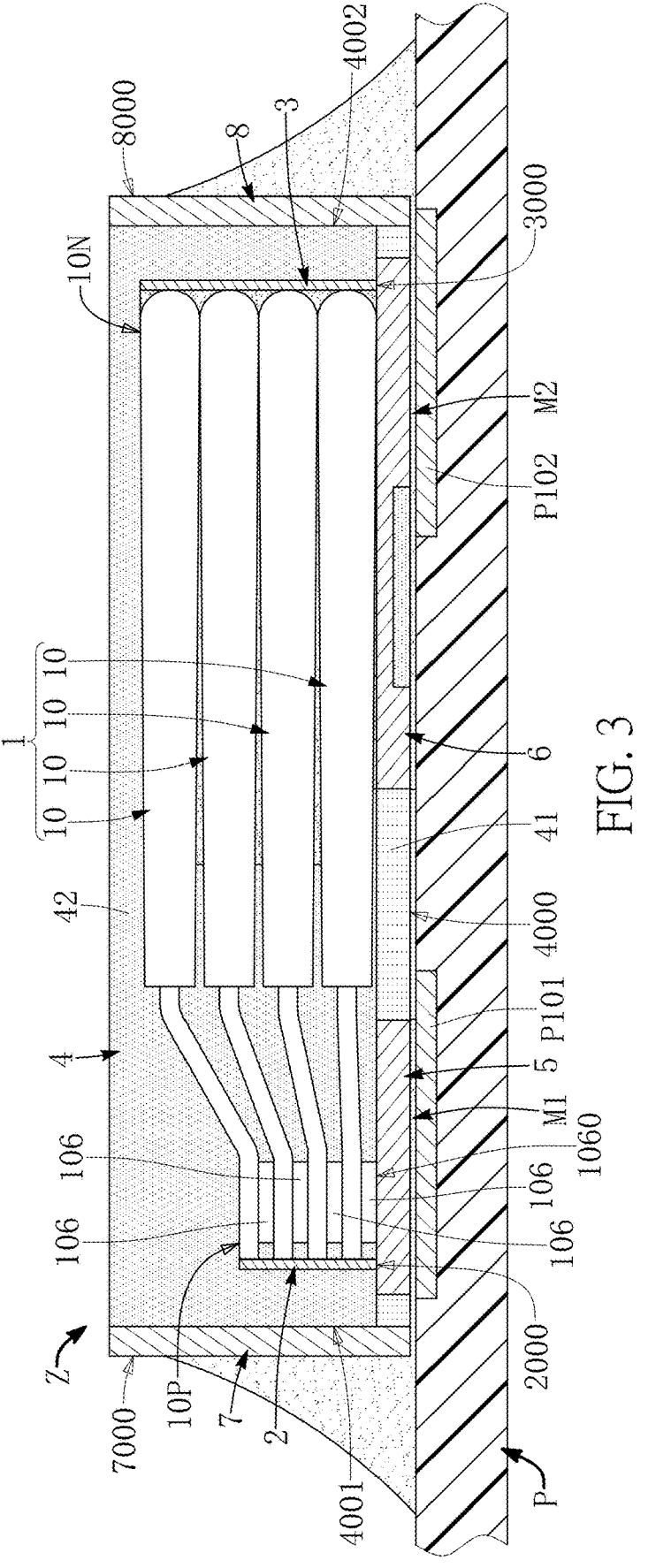
FIG. 3 is a partial schematic cross-sectional view of the capacitor assembly package structure disposed on a circuit substrate according to the first embodiment of the present disclosure.

Referring to FIG. 1 to FIG. 3, a first embodiment of the present disclosure provides a capacitor assembly package structure Z (such as a solid electrolytic capacitor), which includes a capacitor assembly 1, a first inner conductive structure 2 a second inner conductive structure 3, an insulating package body 4, a first bottom electrode structure 5 (such as a first leadframe structure), a second bottom electrode structure 6 (such as a second leadframe structure), a first outermost reinforcement structure 7 (such as a first auxiliary function structure, or a first outermost strengthening structure) and a second outermost reinforcement structure 8 (such as a second auxiliary function structure, or a second outermost strengthening structure). For example, the insulating package body 4 includes a bottom insulating package layer 41 and a top insulating package layer 42 connected to the bottom insulating package layer 41, the bottom insulating package layer 41 can be configured to connect to the first bottom electrode structure 5 and the second bottom electrode structure 6, and the top insulating package layer 42 can be configured for encapsulating or enclosing the capacitor assembly 1. More particularly, in the process of manufacturing the capacitor assembly package structure Z, the bottom insulating package layer 41 can be used to connect the first bottom electrode structure 5 with the second bottom electrode structure 6 in advance, and then the capacitor assembly 1 can be stacked on the first bottom electrode structure 5 and the second bottom electrode structure 6. However, the aforementioned details are disclosed for exemplary purposes only, and are not meant to limit the scope of the present disclosure.

Firstly, referring to FIG. 1 and FIG. 2, the capacitor assembly 1 includes a plurality of capacitor elements 10 (or capacitor units) electrically connected to each other, and each of the capacitor elements 10 has a positive electrode portion 10P (or an node portion) and a negative electrode portion 10N (or a cathode portion). More particularly, each of the capacitor elements 10 has a raised protruding structure 106 disposed on the positive electrode portion 10P, and the raised protruding structure 106 (or a pin support structure, or a pin padding structure) can be disposed on the positive electrode portion 10P, and the raised protruding structure 106 can be disposed on at least one of an upper surface and a lower surface of the positive electrode portion 10P (FIG. 1 shows that the raised protruding structure 106 can be disposed on the lower surface of the positive electrode portion 10P). In addition, the raised protruding structure 106 of each capacitor element 10 has a contact plane 1060 (or a raised plane, or a padding plane), and the contact plane 1060 of the raised protruding structure 106 can be configured to contact the first bottom electrode structure 5 or the positive electrode portion 10P of the adjacent capacitor element 10 (i.e., the exposed pin portion of the adjacent capacitor element 10). Therefore, as shown in FIG. 2, the two positive electrode portions 10P of the two adjacent capacitor elements 10 can be separated from each other through the raised protruding structure 106 (that is to say, the raised protruding structure 106 can be used as a spacer between the two positive electrode portions 10P of the two adjacent capacitor elements 10), thereby reducing a shortest vertical distance between the positive electrode portion 10P and the negative electrode portion 10N of each capacitor element 10, or reducing a bending angle of the positive electrode portion 10P relative to the negative electrode portion 10N in the same capacitor element 10 (That is to say, the raised protruding structure 106 of each capacitor element 10 can be configured to reduce the shortest vertical distance or the shortest separation distance between the positive electrode portion 10P and the negative electrode portion 10N of each capacitor element 10, or reduce the curvature of the bent portion of the positive electrode portion 10P of each capacitor element 10). For example, the capacitor elements 10 can be stacked in sequence, and each of the capacitor elements 10 includes a metal foil 101 (such as Al foil), an insulating surrounding layer 102, a conductive polymer layer 103, a carbon glue layer 104 and a silver glue layer 105. More particularly, the insulating surrounding layer 102 can be configured to be arranged around the metal foil 101, the conductive polymer layer 103 can be configured to cover or enclose a portion of the metal foil 101 and contact the insulating surrounding layer 102, the carbon glue layer 104 can be configured to completely cover or enclose the conductive polymer layer 103 and contact the insulating surrounding layer 102, and the silver glue layer 105 can be configured to completely cover or enclose the carbon glue layer 104 and contact the insulating surrounding layer 102. Moreover, a dielectric layer (or an oxide layer) can be formed on two opposite surfaces of the metal foil 101, and the dielectric layer has a dielectric constant (or a relative permittivity) substantially between 5 and 300. In addition, the raised protruding structure 106 of each capacitor element 10 can be formed with conductive material (such as copper, tin, silver or any conductive material) on the positive electrode portion 10P through printing, coating, electroplating or any processing method. However, the aforementioned details are disclosed for exemplary purposes only, and are not meant to limit the scope of the present disclosure.

Based on the above, it should be noted that a height of the raised protruding structure 106 of each capacitor element 10 (i.e., the height of the raised protruding structure 106 relative to the metal foil 101) can be greater than, less than, or equal to a height of the insulating surrounding layer 102 (i.e., the height of the outer surrounding surface of the insulating surrounding layer 102 relative to the metal foil 101), so that the contact plane 1060 of the raised protruding structure 106 and an outer surrounding surface of the insulating surrounding layer 102 can be aligned with each other or not. In addition, a bending angle of the positive electrode portion 10P of each capacitor element 10 relative to the insulating surrounding layer 102 can be less than 5 degrees (or a bending angle of the positive electrode portion 10P of each capacitor element 10 relative to the negative electrode portion 10N can be less than 5 degrees). For example, the bending angle can be less than any positive integer within 5 degrees. Of course, the bending angle less than 6 degrees or less than 7 degrees can also be an optional range.

Based on the above, it should be noted that the raised protruding structure 106 of each capacitor element 10 can be configured to reduce a shortest vertical distance or a shortest separation distance between the positive electrode portion 10P and the negative electrode portion 10N of each capacitor element 10, so that the positive electrode portions 10P of the capacitor elements 10 do not need to be excessively bent or pulled when the positive electrode portions 10P are stacked in sequence by welding, thereby avoiding leakage of the positive electrode portions 10P (i.e., the exposed pin portions) of the capacitor elements 10 (or reducing leakage current of the capacitor assembly package structure Z) due to bending of the exposed pin portions (such as cracks in the exposed pin portion, or cracks in the connection interface between the exposed pin portion and the insulating package body 4). More particularly, since the positive electrode portions 10P of the capacitor elements 10 can be stacked sequentially by welding without excessive bending and pulling, the number of stacked layers of the capacitor elements 10 can also be increased by approximately 8 to 10 layers (that is to say, the capacitance of the capacitor assembly package structure Z provided by the present disclosure can be increased).

Moreover, referring to FIG. 1 and FIG. 2, the first inner conductive structure 2 is electrically contacting the positive electrode portion 10P of each capacitor element 10, and the first inner conductive structure 2 has a first bottom exposed side 2000. In addition, the second inner conductive structure 3 is electrically contacting the negative electrode portion 10N of each capacitor element 10, and the second inner conductive structure 3 has a second bottom exposed side 3000. More particularly, the positive electrode portion 10P of each capacitor element 10 has a lateral side surface, and the first inner conductive structure 2 is in electrical contact with the lateral side surface of the positive electrode portion

10P of each capacitor element 10 (such as through conductive glue or without extra conductive media). In addition, the negative electrode portion 10N of each capacitor element 10 has a lateral side surface, and the second inner conductive structure 3 is in electrical contact with the lateral side surface of the negative electrode portion 10N of each capacitor element 10 (such as through conductive glue or without extra conductive media). For example, according to different requirements, the first inner conductive structure 2 can be a first pre-fabricated inner conductive sheet (such as a pre-fabricated copper sheet, a pre-fabricated aluminum sheet or a pre-fabricated conductive sheet made of any material) or a first inner conductive layer formed by curing (for example, forming a first conductive material by a dipping method, and then curing the first conductive material to form the first inner conductive layer that can be a silver layer, a copper layer, or a conductive layer made of any material), and the second inner conductive structure 3 can be a second pre-fabricated inner conductive sheet (such as a pre-fabricated copper sheet, a pre-fabricated aluminum sheet or a pre-fabricated conductive sheet made of any material) or a second inner conductive layer formed by curing (for example, forming a second conductive material by a dipping method, and then curing the second conductive material to form the second inner conductive layer that can be a silver layer, a copper layer, or a conductive layer made of any material). However, the aforementioned details are disclosed for exemplary purposes only, and are not meant to limit the scope of the present disclosure.

Moreover, as shown in FIG. 2, the insulating package body 4 can be configured to cover or encapsulate the capacitor elements 10 of the capacitor assembly 1 and can be configured to cover the first inner conductive structure 2 and the second inner conductive structure 3, so that the capacitor elements 10 can be completely covered or encapsulated inside the insulating package body 4, the first inner conductive structure 2 can be completely covered or encapsulated inside the insulating package body 4 except for the first bottom exposed side 2000, and the second inner conductive structure 3 can be completely covered or encapsulated inside the insulating package body 4 except for the second bottom exposed side 3000. For example, according to different requirements, the first inner conductive structure 2 can be vertically or obliquely disposed to contact a top side of the first bottom electrode structure 5, and the second inner conductive structure 3 can be vertically or obliquely disposed to contact a top side of the second bottom electrode structure 6. In addition, according to different requirements, the bottom insulating package layer 41 and the top insulating package layer 42 can be two identical insulating material layers or two different insulating material layers, and the insulating package body 4 can be made of silicon resin, epoxy resin or any insulating package material. However, the aforementioned details are disclosed for exemplary purposes only, and are not meant to limit the scope of the present disclosure.

More particularly, when a material density of the bottom insulating package layer 41 is greater than a material density of the top insulating package layer 42 (for example, the molding pressure applied to form the bottom insulating package layer 41 is greater than the molding pressure applied to form the top insulating package layer 42), an airtightness between the bottom insulating package layer 41 and the first bottom electrode structure 5 can be greater than an airtightness between the top insulating package layer 42 and the first bottom electrode structure 5, and an airtightness between the bottom insulating package layer 41 and the second bottom electrode structure 6 can be greater than an airtightness between the top insulating package layer 42 and the second bottom electrode structure 6. That is to say, the bonding property or bonding strength between the bottom insulating package layer 41 and the first bottom electrode structure 5 can be increased, so that the bottom insulating package layer 41 will not easily cause material vacancies or cracks at the connection interface with the first bottom electrode structure 5, thereby improving the reliability of the capacitor assembly package structure Z. In the same principle, the bonding property or bonding strength between the bottom insulating package layer 41 and the second bottom electrode structure 6 can be increased, so that the bottom insulating package layer 41 will not easily cause material vacancies or cracks at the connection interface with the second bottom electrode structure 6, thereby improving the reliability of the capacitor assembly package structure Z. It is worth noting that the capacitor elements 10 will not be damaged during the forming of the bottom insulating package layer 41, so that the bottom insulating package layer 41 can be formed by a larger molding pressure, but the top insulating package layer 42 needs to be formed by a smaller molding pressure so as to prevent the capacitor elements 10 from being squeezed and damaged by the top insulating package layer 42, which may affect the electrical characteristics provided by the capacitor assembly package structure Z. For example, the bottom insulating package layer 41 can be made of an insulating material that has a viscosity between 5000 cps and 25000 cps (such as any positive integer between 5000 cps and 25000 cps), a curing temperature between 150° C. and 200° C. (such as any positive integer between 150° C. and 200° C.), and a molding pressure between 40 kgf/cm² and 70 kgf/cm² (such as any positive integer between 40 kgf/cm² and 70 kgf/cm²), and the top insulating package layer 42 can be made of an insulating material that has a viscosity between 5000 cps and 25000 cps (such as any positive integer between 5000 cps and 25000 cps), a curing temperature between 150° C. and 200° C. (such as any positive integer between 150° C. and 200° C.), and a molding pressure between 20 kgf/cm² and 40 kgf/cm² (such as any positive integer between 20 kgf/cm² and 40 kgf/cm²). However, the aforementioned details are disclosed for exemplary purposes only, and are not meant to limit the scope of the present disclosure.

In addition, as shown in FIG. 2, the first bottom electrode structure 5 and the second bottom electrode structure 6 are separated from each other by a predetermined distance, and the capacitor assembly 1 is disposed on the first bottom electrode structure 5 and the second bottom electrode structure 6 so as to electrically connect the positive electrode portion 10P and the negative electrode portion 10N of each capacitor element 10 to the first bottom electrode structure 5 and the second bottom electrode structure 6, respectively. Moreover, the first bottom electrode structure 5 can be disposed on a bottom side 4000 of the insulating package body 4 and electrically contact the first bottom exposed side 2000 of the first inner conductive structure 2, and the second bottom electrode structure 6 can be disposed on the bottom side 4000 of the insulating package body 4 and electrically contact the second bottom exposed side 3000 of the second inner conductive structure 3. For example, the first bottom electrode structure 5 has a first upper electroplating layer (not shown) electrically connected to the positive electrode portion 10P of the capacitor element 10 and a first lower electroplating layer (not shown) corresponding to the first upper electroplating layer (not shown), and the second bottom electrode structure 6 has a second upper electroplating layer (not shown) electrically connected to the negative electrode portion 10N of the capacitor element 10 and a second lower electroplating layer (not shown) corresponding to the second upper electroplating layer (not shown). However, the aforementioned details are disclosed for exemplary purposes only, and are not meant to limit the scope of the present disclosure.

More particularly, as shown in FIG. 2, the positive electrode portion 10P of each capacitor element 10 can be electrically connected to the first bottom electrode structure 5 through the first inner conductive structure 2, thereby forming a first shortest conductive path between the positive electrode portion 10P of each capacitor element 10 and the first bottom electrode structure 5 (i.e., a first vertical conductive path that is located between the positive electrode portion 10P of each capacitor element 10 and the first bottom electrode structure 5). In addition, the negative electrode portion 10N of each capacitor element 10 can be electrically connected to the second bottom electrode structure 6 through the second inner conductive structure 3, thereby forming a second shortest conductive path between the negative electrode portion 10N of each capacitor element 10 and the second bottom electrode structure 6 (i.e., a second vertical conductive path that is located between the negative electrode portion 10N of each capacitor element 10 and the second bottom electrode structure 6). It should be noted that the first shortest conductive path does not need to include the first outermost reinforcement structure 7 (without using the first outermost reinforcement structure 7), and the second shortest conductive path does not need to include the second outermost reinforcement structure 8 (without using the second outermost reinforcement structure 8). That is to say, the first inner conductive structure 2 can be electrically connected to the first bottom electrode structure 5 without using the first outermost reinforcement structure 7 (or the first shortest conductive path does not need to move laterally outward to the first outermost reinforcement structure 7 and then return to the first bottom electrode structure 5), and the second inner conductive structure 3 can be electrically connected to the second bottom electrode structure 6 without using the second outermost reinforcement structure 8 (or the second shortest conductive path does not need to move laterally outward to the second outermost reinforcement structure 8 and then return to the second bottom electrode structure 6). For example, only the bottom surface of the first bottom electrode structure 5 and the bottom surface of the second bottom electrode structure 6 are exposed from the insulating package body 4. The second bottom electrode structure 6 can extend to a position near the center of the capacitor assembly package structure Z, thereby improving the supporting force of the second bottom electrode structure 6 for the capacitor elements 10 and effectively increasing the overall structural strength of the capacitor assembly package structure Z. The bottom portion of the second bottom electrode structure 6 has a recessed space that can be filled by the insulating package body 4. The first bottom electrode structure 5 and the second bottom electrode structure 6 can be made of copper material, aluminum material or any conductive material. However, the aforementioned details are disclosed for exemplary purposes only, and are not meant to limit the scope of the present disclosure.

Furthermore, as shown in FIG. 2, the first outermost reinforcement structure 7 is adjacent to the first bottom electrode structure 5 and disposed on a first side 4001 of the insulating package body 4, and the first bottom electrode structure 5 and the first outermost reinforcement structure 7 are separated from each other by a predetermined distance (that is to say, the first bottom electrode structure 5 and the first outermost reinforcement structure 7 are not in contact with each other). In addition, the second outermost reinforcement structure 8 is adjacent to the second bottom electrode structure 6 and disposed on a second side 4002 of the insulating package body 4, and the second bottom electrode structure 6 and the second outermost reinforcement structure 8 are separated from each other by a predetermined distance (that is to say, the second bottom electrode structure 6 and the second outermost reinforcement structure 8 are not in contact with each other). More particularly, the first outermost reinforcement structure 7 can be configured to provide a first outermost exposed surface 7000 in contact with the outside world, and the second outermost reinforcement structure 8 can be configured to provide a second outermost exposed surface 8000 in contact with the outside world. For example, the first outermost reinforcement structure 7 can be a first pre-fabricated outermost conductive sheet (such as a pre-fabricated copper sheet, a pre-fabricated aluminum sheet or a pre-fabricated conductive sheet made of any material) or a first outermost conductive layer formed by curing (for example, forming a first conductive material by a dipping method, and then curing the first conductive material to form the first outermost conductive layer that can be a silver layer, a copper layer, or a conductive layer made of any material), and the second outermost reinforcement structure 8 can be a second pre-fabricated outermost conductive sheet (such as a pre-fabricated copper sheet, a pre-fabricated aluminum sheet or a pre-fabricated conductive sheet made of any material) or a second outermost conductive layer formed by curing (for example, forming a second conductive material by a dipping method, and then curing the second conductive material to form the second outermost conductive layer that can be a silver layer, a copper layer, or a conductive layer made of any material). However, the aforementioned details are disclosed for exemplary purposes only, and are not meant to limit the scope of the present disclosure.

Moreover, referring to FIG. 2 and FIG. 3, when the capacitor assembly package structure Z is disposed on a circuit substrate P, the first bottom electrode structure 5 can be electrically connected to a first pad P101 of the circuit substrate P through a first conductive material M1 (such as solder ball, solder paste or any conductive material), and the second bottom electrode structure 6 can be electrically connected to a second pad P102 of the circuit substrate P through a second conductive material M2 (such as solder ball, solder paste or any conductive material). More particularly, as shown in FIG. 3, when the capacitor assembly package structure Z is disposed on the circuit substrate P, the first outermost exposed surface 7000 of the first outermost reinforcement structure 7 can be partially or completely covered or enclosed by the first conductive material M1 (that is to say, the first conductive material M1 can be configured to cover the first outermost exposed surface 7000 to form a first tin-climbing structure or a first solder wicking structure), and the second outermost exposed surface 8000 of the second outermost reinforcement structure 8 can be partially or completely covered or enclosed by the second conductive material M2 (that is to say, the second conductive material M2 can be configured to cover the second outermost exposed surface 8000 to form a second tin-climbing structure or a second solder wicking structure), thereby increasing a contact area between the first outermost reinforcement structure 7 and the first conductive material M1, and increasing a contact area between the second outermost reinforcement structure 8 and the second conductive material M2.

It should be noted that, for example, as shown in FIG. 3, the first conductive material M1 can also be divided into a first conductive portion (in which the first conductive portion is electrically connected between the first bottom electrode structure 5 and the first pad P101 of the circuit substrate P so as to provide an electrical conduction function) and a first solder wicking portion (in which the first solder wicking portion is used to cover the first outermost exposed surface 7000 of the first outermost reinforcement structure 7 so as to provide a structural strengthening function), and the first conductive portion of the first conductive material M1 and the first solder wicking portion can be separated from each other or connected to each other. In addition, the second conductive material M2 can also be divided into a second conductive portion (in which the second conductive portion is electrically connected between the second bottom electrode structure 6 and the second pad P102 of the circuit substrate P so as to provide an electrical conduction function) and a second solder wicking portion (in which the second solder wicking portion is used to cover the second outermost exposed surface 8000 of the second outermost reinforcement structure 8 so as to provide a structural strengthening function), and the second conductive portion of the second conductive material M2 and the second solder wicking portion can be separated from each other or connected to each other. However, the aforementioned details are disclosed for exemplary purposes only, and are not meant to limit the scope of the present disclosure.

Second Embodiment

Figure 4:
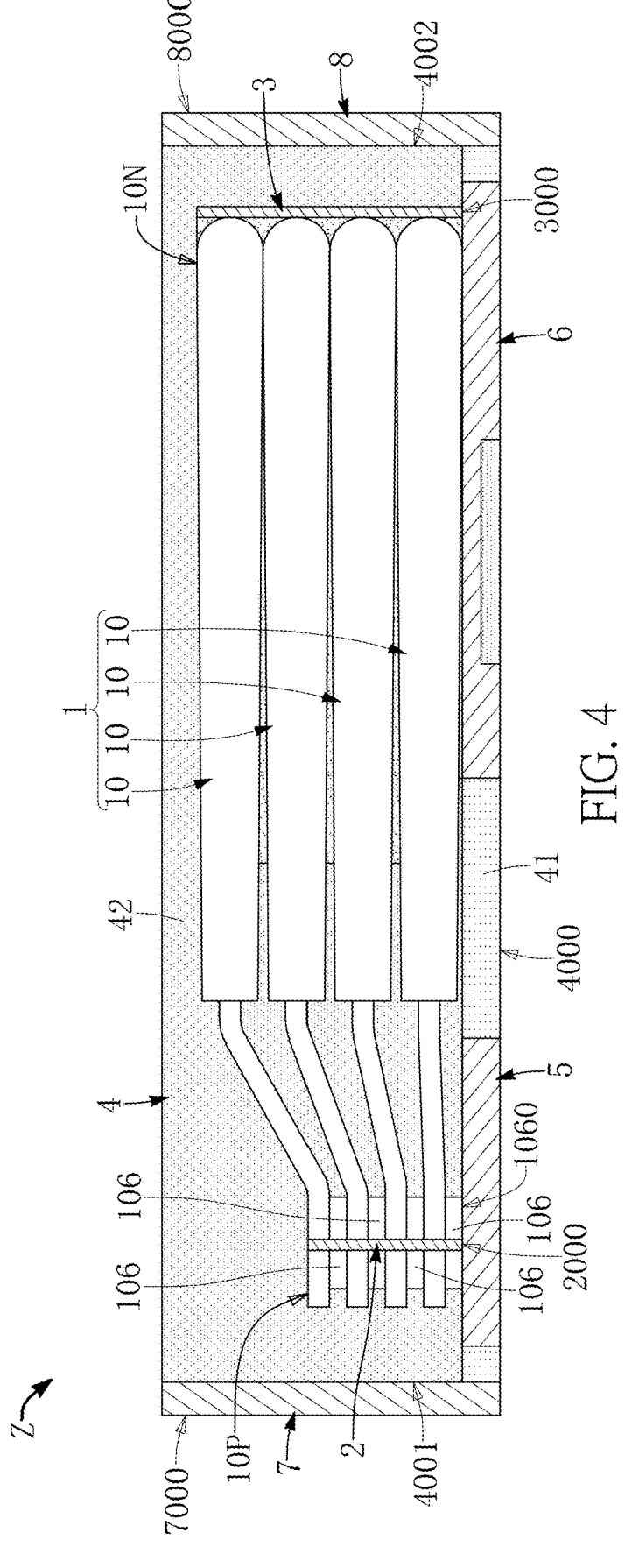
FIG. 4 is a partial schematic cross-sectional view of the capacitor assembly package structure provided by a second embodiment of the present disclosure.

Referring to FIG. 4, a second embodiment of the present disclosure provides a capacitor assembly package structure Z, which includes a capacitor assembly 1, a first inner conductive structure 2 a second inner conductive structure 3, an insulating package body 4, a first bottom electrode structure 5, a second bottom electrode structure 6, a first outermost reinforcement structure 7 and a second outermost reinforcement structure 8. Comparing FIG. 4 with FIG. 2, the main difference between the second embodiment and the first embodiment is as follows: in the second embodiment, the first inner conductive structure 2 can be configured to penetrate or pass through the positive electrode portions 10P of the capacitor elements 10 to electrically contact the first bottom electrode structure 5. For example, the first inner conductive structure 2 (such as soldering flux) can penetrate the positive electrode portions 10P of the capacitor elements 10 and be electrically connected to the positive electrode portions 10P of the capacitor elements 10.

Third Embodiment

Figure 5:
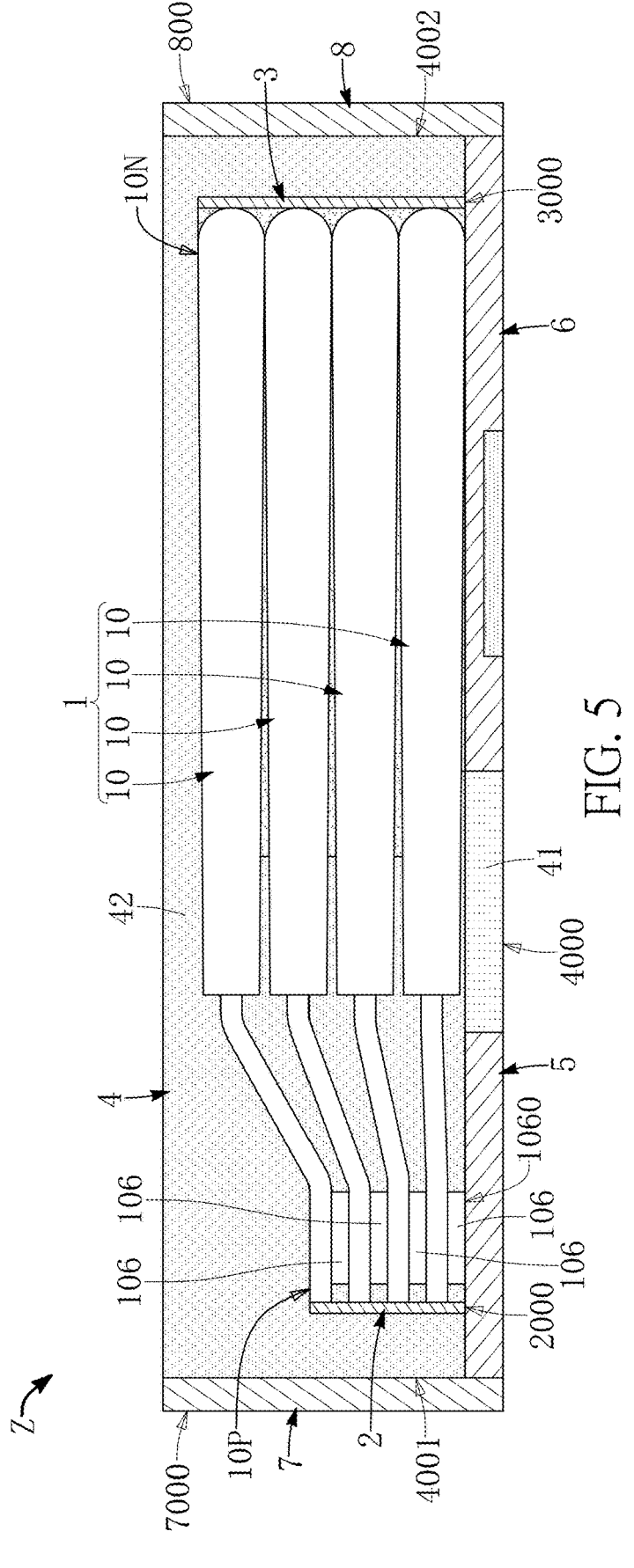
FIG. 5 is a partial schematic cross-sectional view of the capacitor assembly package structure provided by a third embodiment of the present disclosure.
Figure 6:
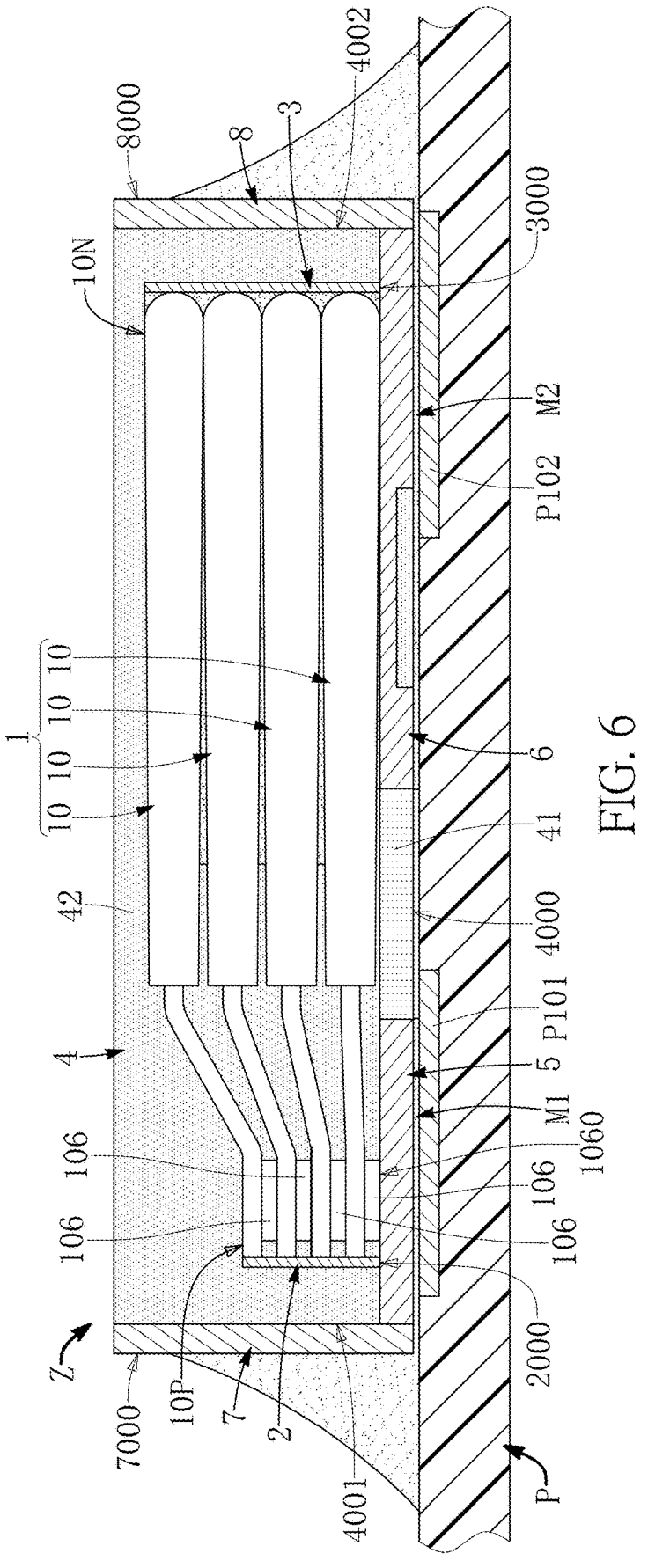
FIG. 6 is a partial schematic cross-sectional view of the capacitor assembly package structure disposed on the circuit substrate according to the third embodiment of the present disclosure.

Referring to FIG. 5 and FIG. 6, a third embodiment of the present disclosure provides a capacitor assembly package structure Z, which includes a capacitor assembly 1, a first inner conductive structure 2 a second inner conductive structure 3, an insulating package body 4, a first bottom electrode structure 5, a second bottom electrode structure 6, a first outermost reinforcement structure 7 and a second outermost reinforcement structure 8. In addition, when the capacitor assembly package structure Z is disposed on a circuit substrate P, the first bottom electrode structure 5 can be electrically connected to a first pad P101 of the circuit substrate P through a first conductive material M1, and the second bottom electrode structure 6 can be electrically connected to a second pad P102 of the circuit substrate P through a second conductive material M2. Comparing FIG.

5 with FIG. 2, and comparing FIG. 6 with FIG. 3, the main difference between the third embodiment and the first embodiment is as follows: in the third embodiment, the first bottom electrode structure 5 and the first outermost reinforcement structure 7 can be connected to each other, and the second bottom electrode structure 6 and the second outermost reinforcement structure 8 can be connected to each other.

More particularly, as shown in FIG. 5, when the first bottom electrode structure 5 and the first outermost reinforcement structure 7 are connected to each other, the first bottom electrode structure 5 and the first outermost reinforcement structure 7 can cooperate with each other to form a first L-shaped structure (or a first similar L-shaped structure). In addition, when the second bottom electrode structure 6 and the second outermost reinforcement structure 8 are connected to each other, the second bottom electrode structure 6 and the second outermost reinforcement structure 8 can cooperate with each other to form a second L-shaped structure (or a second similar L-shaped structure).

Fourth Embodiment

Figure 7:
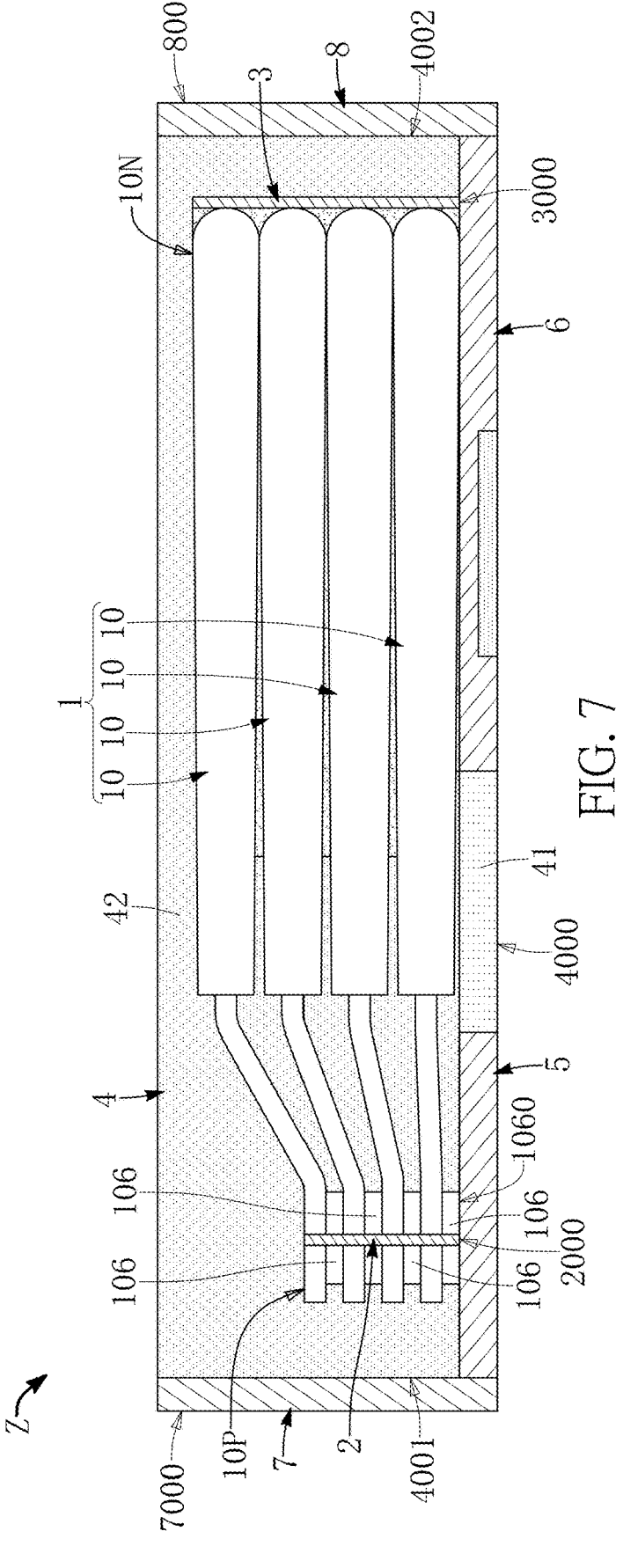
FIG. 7 is a partial schematic cross-sectional view of the capacitor assembly package structure provided by a fourth embodiment of the present disclosure.

Referring to FIG. 7, a fourth embodiment of the present disclosure provides a capacitor assembly package structure Z, which includes a capacitor assembly 1, a first inner conductive structure 2 a second inner conductive structure 3, an insulating package body 4, a first bottom electrode structure 5, a second bottom electrode structure 6, a first outermost reinforcement structure 7 and a second outermost reinforcement structure 8. Comparing FIG. 7 with FIG. 5, the main difference between the fourth embodiment and the third embodiment is as follows: in the fourth embodiment, the first inner conductive structure 2 can be configured to penetrate or pass through the positive electrode portions 10P of the capacitor elements 10 to electrically contact the first bottom electrode structure 5. For example, the first inner conductive structure 2 (such as soldering flux) can penetrate the positive electrode portions 10P of the capacitor elements 10 and be electrically connected to the positive electrode portions 10P of the capacitor elements 10.

Fifth Embodiment

Figure 8:
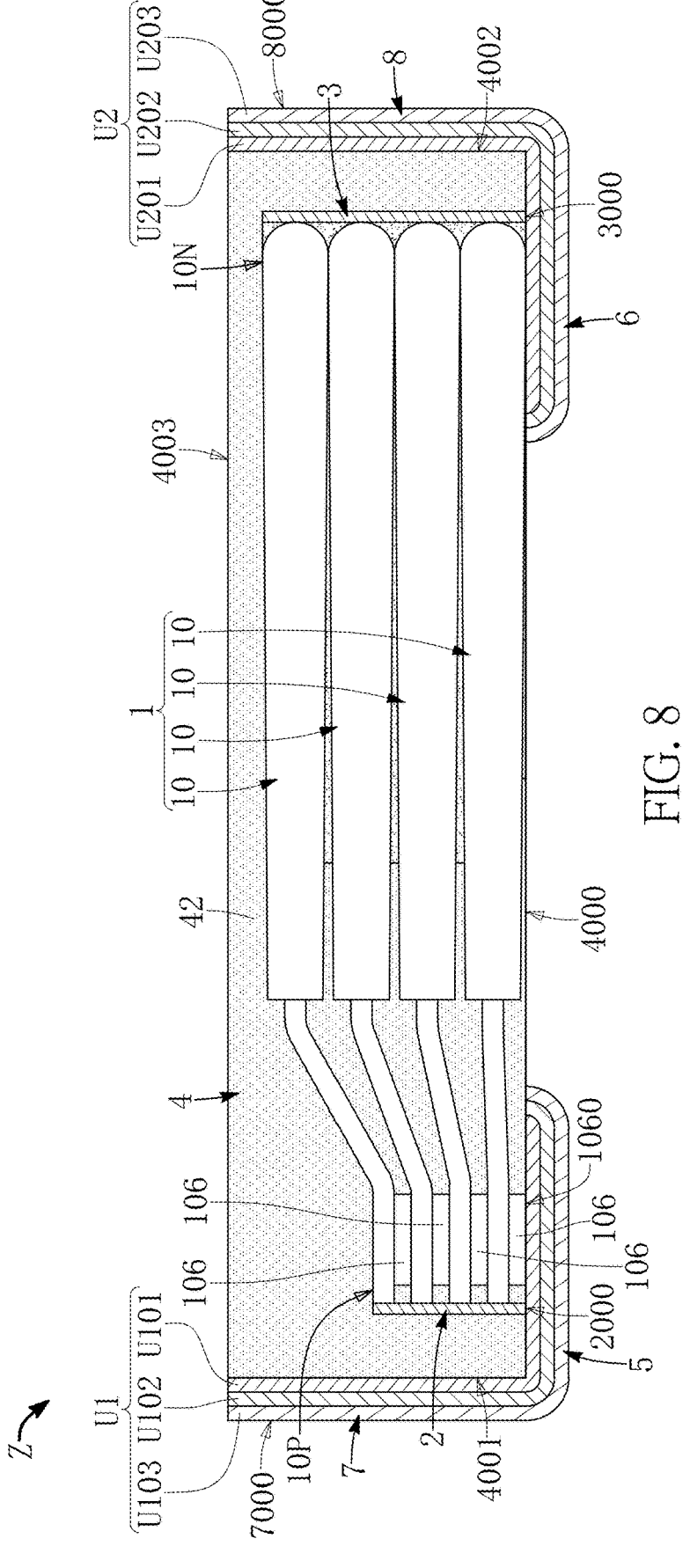
FIG. 8 is a partial schematic cross-sectional view of the capacitor assembly package structure provided by a fifth embodiment of the present disclosure.
Figure 9:
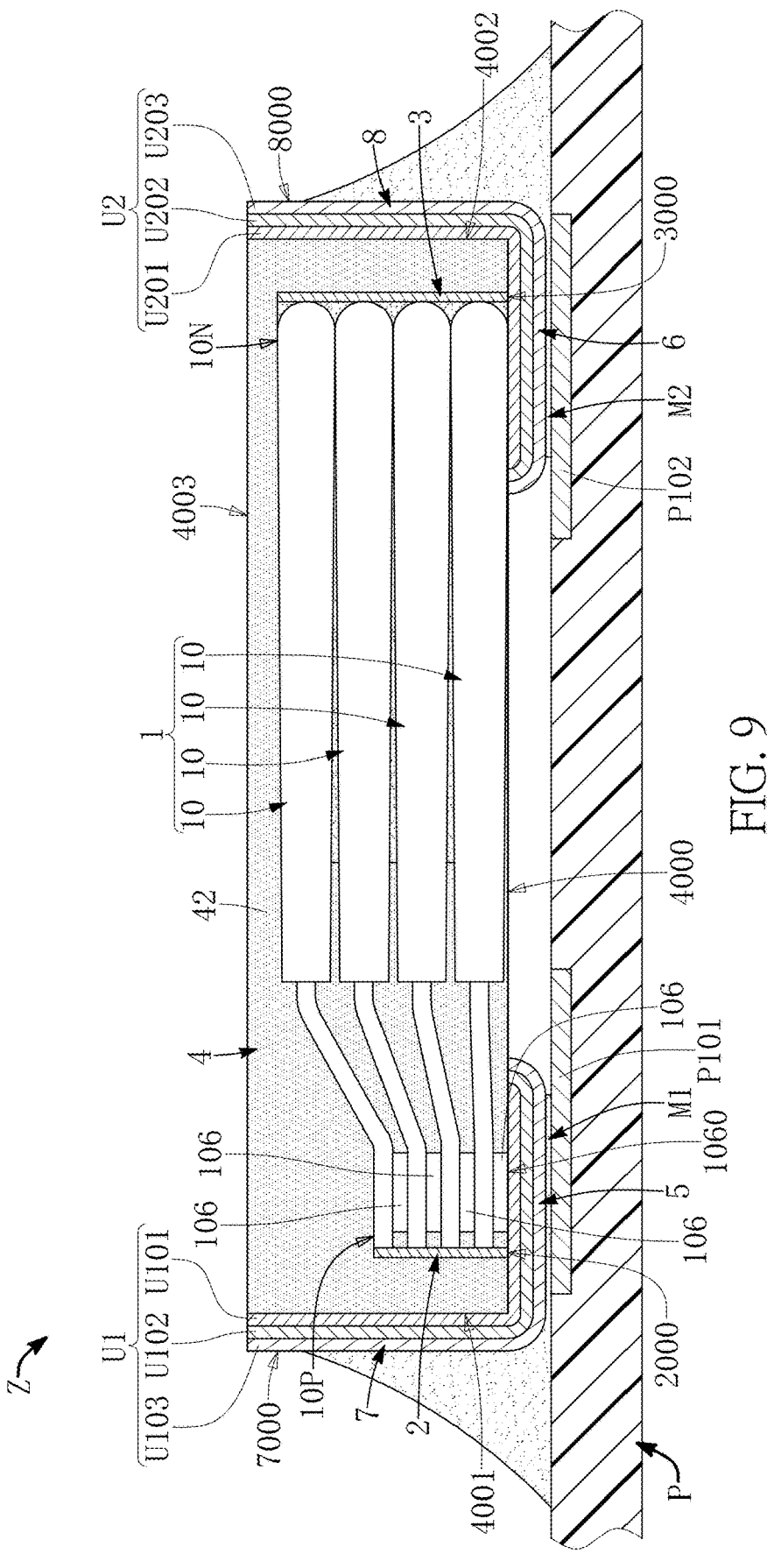
FIG. 9 is a partial schematic cross-sectional view of the capacitor assembly package structure disposed on the circuit substrate according to the fifth embodiment of the present disclosure.

Referring to FIG. 8 and FIG. 9, a fifth embodiment of the present disclosure provides a capacitor assembly package structure Z, which includes a capacitor assembly 1, a first inner conductive structure 2 a second inner conductive structure 3, an insulating package body 4, a first bottom electrode structure 5, a second bottom electrode structure 6, a first outermost reinforcement structure 7 and a second outermost reinforcement structure 8. In addition, when the capacitor assembly package structure Z is disposed on a circuit substrate P, the first bottom electrode structure 5 can be electrically connected to a first pad P101 of the circuit substrate P through a first conductive material M1, and the second bottom electrode structure 6 can be electrically connected to a second pad P102 of the circuit substrate P through a second conductive material M2. Comparing FIG. 8 with FIG. 5, and comparing FIG. 9 with FIG. 6, the main difference between the fifth embodiment and the third embodiment is as follows: in the fifth embodiment, neither the first outermost reinforcement structure 7 nor the second outermost reinforcement structure 8 can extend to a top side 4003 of the insulating package body 4.

More particularly, as shown in FIG. 8, the first bottom electrode structure 5 and the first outermost reinforcement structure 7 can be connected to each other to form a first terminal structure U1. For example, the first terminal structure U1 may include a first inner conductive layer U101 for covering a first portion of the insulating package body 4, a first intermediate conductive layer U102 for covering the first inner conductive layer U101, and a first outer conductive layer U103 for covering the first intermediate conductive layer U102. In addition, the first inner conductive layer U101 can be at least one of an Ag layer or a Cu layer, the first intermediate conductive layer U102 can be a Ni layer, and the first outer conductive layer U103 can be a Sn layer. However, the aforementioned details are disclosed for exemplary purposes only, and are not meant to limit the scope of the present disclosure.

More particularly, as shown in FIG. 8, the second bottom electrode structure 6 and the second outermost reinforcement structure 8 can be connected to each other to form a second terminal structure U2. For example, the second terminal structure U2 may include a second inner conductive layer U201 for covering a second portion of the insulating package body 4, a second intermediate conductive layer U202 for covering the second inner conductive layer U201, and a second outer conductive layer U203 for covering the second intermediate conductive layer U202. In addition, the second inner conductive layer U201 can be at least one of an Ag layer or a Cu layer, the second intermediate conductive layer U202 can be a Ni layer, and the second outer conductive layer U203 can be a Sn layer. However, the aforementioned details are disclosed for exemplary purposes only, and are not meant to limit the scope of the present disclosure.

Sixth Embodiment

Figure 10:
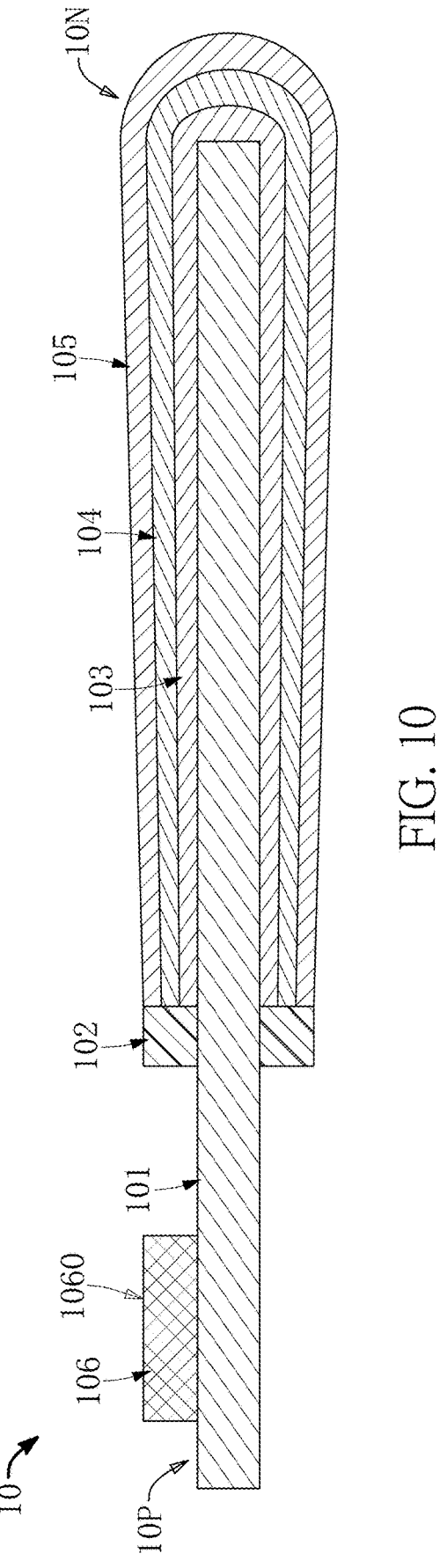
FIG. 10 is a schematic cross-sectional view of a second capacitor element provided by a sixth embodiment of the present disclosure.

Referring to FIG. 10, a sixth embodiment of the present disclosure provides a second capacitor element 10, and the raised protruding structure 106 of the second capacitor element 10 can be disposed on an upper surface of the positive electrode portion 10P. Therefore, according to different requirements, the raised protruding structure 106 of the second capacitor element 10 can be disposed on at least one of an upper surface and a lower surface of the positive electrode portion 10P (as shown in FIG. 1 or FIG. 10), or the raised protruding structure 106 of the second capacitor element 10 can be disposed on an upper surface and a lower surface of the positive electrode portion 10P.

Beneficial Effects of the Embodiments

In conclusion, in the capacitor assembly package structure Z provided by the present disclosure, by virtue of "each of the capacitor elements 10 having a raised protruding structure 106 disposed on the positive electrode portion 10P," the raised protruding structure 106 of each capacitor element 10 can be configured to reduce a shortest vertical distance between the positive electrode portion 10P and the negative electrode portion 10N of each capacitor element 10.

Furthermore, the capacitor assembly 1 and any one of the first bottom electrode structure 5 and the second bottom electrode structure 6 can be matched with insulating packaging materials (such as a bottom insulating package layer 41 and top insulating package layer 42 having different material densities) with different forming conditions.

Moreover, the positive electrode portion 10P of each capacitor element 10 can be electrically connected to the first bottom electrode structure 5 through the first inner conductive structure 2, thereby forming a first shortest conductive path between the positive electrode portion 10P of each capacitor element 10 and the first bottom electrode structure 5. In addition, the negative electrode portion 10N of each capacitor element 10 can be electrically connected to the second bottom electrode structure 6 through the second inner conductive structure 3, thereby forming a second shortest conductive path between the negative electrode portion 10N of each capacitor element 10 and the second bottom electrode structure 6.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A capacitor assembly package structure, comprising:
a first bottom electrode structure;
a second bottom electrode structure separate from the first bottom electrode structure;
a capacitor assembly disposed on the first bottom electrode structure and the second bottom electrode structure, wherein the capacitor assembly includes a plurality of capacitor elements electrically connected to each other, and each of the capacitor elements has a positive electrode portion electrically connected to the first bottom electrode structure and a negative electrode portion electrically connected to the second bottom electrode structure; and
an insulating package body configured to cover the capacitor elements of the capacitor assembly;
wherein each of the capacitor elements has a raised protruding structure disposed on the positive electrode portion, and the raised protruding structure is disposed on at least one of an upper surface and a lower surface of the positive electrode portion;
wherein the capacitor assembly package structure further comprises:
a first inner conductive structure electrically contacting the positive electrode portion of each capacitor element, wherein the first inner conductive structure has a first bottom exposed side;
a second inner conductive structure electrically contacting the negative electrode portion of each capacitor element, wherein the second inner conductive structure has a second bottom exposed side;
a first outermost reinforcement structure adjacent to the first bottom electrode structure and disposed on a first side of the insulating package body; and
a second outermost reinforcement structure adjacent to the second bottom electrode structure and disposed on a second side of the insulating package body.

2. The capacitor assembly package structure according to claim 1,
wherein the first bottom electrode structure is disposed on a bottom side of the insulating package body and electrically contact the first bottom exposed side of the first inner conductive structure, and the second bottom electrode structure is disposed on the bottom side of the insulating package body and electrically contact the second bottom exposed side of the second inner conductive structure;
wherein the insulating package body is configured to cover the first inner conductive structure and the second inner conductive structure;
wherein the positive electrode portion of each capacitor element is electrically connected to the first bottom electrode structure through the first inner conductive structure, thereby forming a first shortest conductive path between the positive electrode portion of each capacitor element and the first bottom electrode structure;
wherein the negative electrode portion of each capacitor element is electrically connected to the second bottom electrode structure through the second inner conductive structure, thereby forming a second shortest conductive path between the negative electrode portion of each capacitor element and the second bottom electrode structure;
wherein the first shortest conductive path does not need to include the first outermost reinforcement structure, and the second shortest conductive path does not need to include the second outermost reinforcement structure;
wherein the first outermost reinforcement structure is configured to provide a first outermost exposed surface, and the second outermost reinforcement structure is configured to provide a second outermost exposed surface.

3. The capacitor assembly package structure according to claim 2,
wherein each of the capacitor elements includes a metal foil, an insulating surrounding layer, a conductive polymer layer, a carbon glue layer and a silver glue layer, the insulating surrounding layer is configured to be arranged around the metal foil, the conductive polymer layer is configured to cover a portion of the metal foil and contact the insulating surrounding layer, the carbon glue layer is configured to completely cover the conductive polymer layer and contact the insulating surrounding layer, and the silver glue layer is configured to completely cover the carbon glue layer and contact the insulating surrounding layer;
wherein the positive electrode portion of each capacitor element has a lateral side surface, and the first inner conductive structure is in electrical contact with the lateral side surface of the positive electrode portion of each capacitor element;
wherein the negative electrode portion of each capacitor element has a lateral side surface, and the second inner conductive structure is in electrical contact with the lateral side surface of the negative electrode portion of each capacitor element;
wherein the capacitor elements are completely covered inside the insulating package body, the first inner conductive structure is completely covered inside the insulating package body except for the first bottom exposed side, and the second inner conductive structure is completely covered inside the insulating package body except for the second bottom exposed side.

4. The capacitor assembly package structure according to claim 2,
wherein each of the capacitor elements includes a metal foil, an insulating surrounding layer, a conductive polymer layer, a carbon glue layer and a silver glue layer, the insulating surrounding layer is configured to be arranged around the metal foil, the conductive polymer layer is configured to cover a portion of the metal foil and contact the insulating surrounding layer, the carbon glue layer is configured to completely cover the conductive polymer layer and contact the insulating surrounding layer, and the silver glue layer is configured to completely cover the carbon glue layer and contact the insulating surrounding layer;

wherein the first inner conductive structure is configured to penetrate through the positive electrode portions of the capacitor elements to electrically contact the first bottom electrode structure;

wherein the negative electrode portion of each capacitor element has a lateral side surface, and the second inner conductive structure is in electrical contact with the lateral side surface of the negative electrode portion of each capacitor element;

wherein the capacitor elements are completely covered inside the insulating package body, the first inner conductive structure is completely covered inside the insulating package body except for the first bottom exposed side, and the second inner conductive structure is completely covered inside the insulating package body except for the second bottom exposed side.

5. The capacitor assembly package structure according to claim 2, wherein the first bottom electrode structure and the first outermost reinforcement structure are connected to each other or separated from each other by a predetermined distance, and the second bottom electrode structure and the second outermost reinforcement structure are connected to each other or separated from each other by a predetermined distance;

wherein, when the first bottom electrode structure and the first outermost reinforcement structure are connected to each other, the first bottom electrode structure and the first outermost reinforcement structure cooperate with each other to form a first L-shaped structure;

wherein, when the second bottom electrode structure and the second outermost reinforcement structure are connected to each other, the second bottom electrode structure and the second outermost reinforcement structure cooperate with each other to form a second L-shaped structure;

wherein the first inner conductive structure is vertically or obliquely disposed to contact a top side of the first bottom electrode structure, and the second inner conductive structure is vertically or obliquely disposed to contact a top side of the second bottom electrode structure;

wherein the first inner conductive structure is electrically connected to the first bottom electrode structure without using the first outermost reinforcement structure, and the second inner conductive structure is electrically connected to the second bottom electrode structure without using the second outermost reinforcement structure;

wherein the first inner conductive structure is a first pre-fabricated inner conductive sheet or a first inner conductive layer formed by curing, and the second inner conductive structure is a second pre-fabricated inner conductive sheet or a second inner conductive layer formed by curing;

wherein the first outermost reinforcement structure is a first pre-fabricated outermost conductive sheet or a first outermost conductive layer formed by curing, and the second outermost reinforcement structure is a second pre-fabricated outermost conductive sheet or a second outermost conductive layer formed by curing;

wherein, when the capacitor assembly package structure is disposed on a circuit substrate, the first bottom electrode structure is electrically connected to a first pad of the circuit substrate through a first conductive material, and the second bottom electrode structure is electrically connected to a second pad of the circuit substrate through a second conductive material;

wherein, when the capacitor assembly package structure is disposed on the circuit substrate, the first outermost exposed surface of the first outermost reinforcement structure is partially or completely covered by the first conductive material, and the second outermost exposed surface of the second outermost reinforcement structure is partially or completely covered by the second conductive material, thereby increasing a contact area between the first outermost reinforcement structure and the first conductive material, and increasing a contact area between the second outermost reinforcement structure and the second conductive material.

6. The capacitor assembly package structure according to claim 2, wherein, neither the first outermost reinforcement structure nor the second outermost reinforcement structure extends to a top side of the insulating package body;

wherein the first bottom electrode structure and the first outermost reinforcement structure are connected to each other to form a first terminal structure;

wherein the second bottom electrode structure and the second outermost reinforcement structure are connected to each other to form a second terminal structure;

wherein the first terminal structure includes a first inner conductive layer for covering a first portion of the insulating package body, a first intermediate conductive layer for covering the first inner conductive layer, and a first outer conductive layer for covering the first intermediate conductive layer, and the second terminal structure includes a second inner conductive layer for covering a second portion of the insulating package body, a second intermediate conductive layer for covering the second inner conductive layer, and a second outer conductive layer for covering the second intermediate conductive layer;

wherein the first inner conductive layer and the second inner conductive layer are Ag layers or Cu layers, the first intermediate conductive layer and the second intermediate conductive layer are Ni layers, and the first outer conductive layer and the second outer conductive layer are Sn layers;

wherein the first inner conductive structure is vertically or obliquely disposed to contact a top side of the first bottom electrode structure, and the second inner conductive structure is vertically or obliquely disposed to contact a top side of the second bottom electrode structure;

wherein the first inner conductive structure is electrically connected to the first bottom electrode structure without using the first outermost reinforcement structure, and the second inner conductive structure is electrically connected to the second bottom electrode structure without using the second outermost reinforcement structure;

wherein the first inner conductive structure is a first pre-fabricated inner conductive sheet or a first inner conductive layer formed by curing, and the second inner conductive structure is a second pre-fabricated inner conductive sheet or a second inner conductive layer formed by curing;

wherein the first outermost reinforcement structure is a first pre-fabricated outermost conductive sheet or a first outermost conductive layer formed by curing, and the second outermost reinforcement structure is a second pre-fabricated outermost conductive sheet or a second outermost conductive layer formed by curing;

wherein, when the capacitor assembly package structure is disposed on a circuit substrate, the first bottom electrode structure is electrically connected to a first pad of the circuit substrate through a first conductive material, and the second bottom electrode structure is electrically connected to a second pad of the circuit substrate through a second conductive material;

wherein, when the capacitor assembly package structure is disposed on the circuit substrate, the first outermost exposed surface of the first outermost reinforcement structure is partially or completely covered by the first conductive material, and the second outermost exposed surface of the second outermost reinforcement structure is partially or completely covered by the second conductive material, thereby increasing a contact area between the first outermost reinforcement structure and the first conductive material, and increasing a contact area between the second outermost reinforcement structure and the second conductive material.

7. The capacitor assembly package structure according to claim 1, wherein the insulating package body includes a bottom insulating package layer and a top insulating package layer connected to the bottom insulating package layer, the bottom insulating package layer is configured to connect to the first bottom electrode structure and the second bottom electrode structure, and the top insulating package layer is configured for encapsulating the capacitor assembly;

wherein the bottom insulating package layer and the top insulating package layer are two identical insulating material layers or two different insulating material layers;

wherein a material density of the bottom insulating package layer is greater than a material density of the top insulating package layer;

wherein an airtightness between the bottom insulating package layer and the first bottom electrode structure is greater than an airtightness between the top insulating package layer and the first bottom electrode structure;

wherein an airtightness between the bottom insulating package layer and the second bottom electrode structure is greater than an airtightness between the top insulating package layer and the second bottom electrode structure;

wherein the bottom insulating package layer is made of an insulating material that has a viscosity between 5000 cps and 25000 cps, a curing temperature between 150° C. and 200° C., and a molding pressure between 40 kgf/cm$^2$ and 70 kgf/cm$^2$;

wherein the top insulating package layer is made of an insulating material that has a viscosity between 5000 cps and 25000 cps, a curing temperature between 150° C. and 200° C., and a molding pressure between 20 kgf/cm$^2$ and 40 kgf/cm$^2$;

wherein the raised protruding structure of each capacitor element has a contact plane, and the contact plane of the raised protruding structure is configured to contact the first bottom electrode structure or the positive electrode portion of an adjacent one of the capacitor elements;

wherein each of the capacitor elements includes an insulating surrounding layer, and a height of the raised protruding structure of each capacitor element is greater than, less than, or equal to a height of the insulating surrounding layer, so that the contact plane of the raised protruding structure and an outer surrounding surface of the insulating surrounding layer are aligned with each other or not;

wherein a bending angle of the positive electrode portion of each capacitor element relative to the insulating surrounding layer is less than 5 degrees.

8. A capacitor assembly package structure, comprising:

a first bottom electrode structure;

a second bottom electrode structure separate from the first bottom electrode structure;

a capacitor assembly disposed on the first bottom electrode structure and the second bottom electrode structure, wherein the capacitor assembly includes a plurality of capacitor elements electrically connected to each other, and each of the capacitor elements has a positive electrode portion electrically connected to the first bottom electrode structure and a negative electrode portion electrically connected to the second bottom electrode structure; and an insulating package body configured to cover the capacitor elements of the capacitor assembly;

wherein each of the capacitor elements has a raised protruding structure disposed on the positive electrode portion, and the raised protruding structure of each capacitor element is configured to reduce a shortest vertical distance between the positive electrode portion and the negative electrode portion of each capacitor element;

wherein the capacitor assembly package structure further comprises:

a first inner conductive structure electrically contacting the positive electrode portion of each capacitor element, wherein the first inner conductive structure has a first bottom exposed side;

a second inner conductive structure electrically contacting the negative electrode portion of each capacitor element, wherein the second inner conductive structure has a second bottom exposed side;

a first outermost reinforcement structure adjacent to the first bottom electrode structure and disposed on a first side of the insulating package body; and a second outermost reinforcement structure adjacent to the second bottom electrode structure and disposed on a second side of the insulating package body.

9. The capacitor assembly package structure according to claim 8, wherein the insulating package body includes a bottom insulating package layer and a top insulating package layer connected to the bottom insulating package layer, the bottom insulating package layer is configured to connect to the first bottom electrode structure and the second bottom electrode structure, and the top insulating package layer is configured for encapsulating the capacitor assembly;

wherein the bottom insulating package layer and the top insulating package layer are two identical insulating material layers or two different insulating material layers;

wherein a material density of the bottom insulating package layer is greater than a material density of the top insulating package layer;

wherein an airtightness between the bottom insulating package layer and the first bottom electrode structure is greater than an airtightness between the top insulating package layer and the first bottom electrode structure;

wherein an airtightness between the bottom insulating package layer and the second bottom electrode structure is greater than an airtightness between the top insulating package layer and the second bottom electrode structure;

wherein the bottom insulating package layer is made of an insulating material that has a viscosity between 5000 cps and 25000 cps, a curing temperature between 150° C. and 200° C., and a molding pressure between 40 kgf/cm$^2$ and 70 kgf/cm$^2$;

wherein the top insulating package layer is made of an insulating material that has a viscosity between 5000 cps and 25000 cps, a curing temperature between 150° C. and 200° C., and a molding pressure between 20 kgf/cm$^2$ and 40 kgf/cm$^2$.

\* \* \* \* \*